United States Patent [19]
Seidel

[11] 4,056,872
[45] Nov. 8, 1977

[54] POSITIVE RAKE CUTTING INSERT FOR USE IN NEGATIVE RAKE HOLDERS

[75] Inventor: Heinz H. Seidel, Warren, Mich.

[73] Assignee: GTE Sylvania Incorporated, Stamford, Conn.

[21] Appl. No.: 772,662

[22] Filed: Feb. 28, 1977

Related U.S. Application Data

[63] Continuation of Ser. No. 619,209, Oct. 3, 1975, abandoned.

[51] Int. Cl.² .............................................. B26D 1/00
[52] U.S. Cl. ................................................. 407/114
[58] Field of Search .................................. 29/95 R, 96

[56] References Cited
U.S. PATENT DOCUMENTS

| | | | |
|---|---|---|---|
| 3,137,917 | 6/1964 | Dowd | 29/95 R |
| 3,399,442 | 9/1968 | Jones et al. | 29/95 R |
| 3,504,413 | 4/1970 | Siewert et al. | 29/96 |
| 3,786,541 | 1/1974 | Lundgren | 29/95 R |
| 3,800,379 | 4/1974 | Hopkins | 29/95 R |

*Primary Examiner*—Harrison L. Hinson
*Attorney, Agent, or Firm*—Norman J. O'Malley; Lawrence R. Fraley; John C. Fox

[57] ABSTRACT

An improved cutting insert for presenting positive back and side rake angles to the surface of a workpiece when the insert is positioned within a negative rake tool holder. The improvement comprises providing each of the inner and outer portions of the insert's channel with two straight faces which intersect at a common juncture.

4 Claims, 8 Drawing Figures

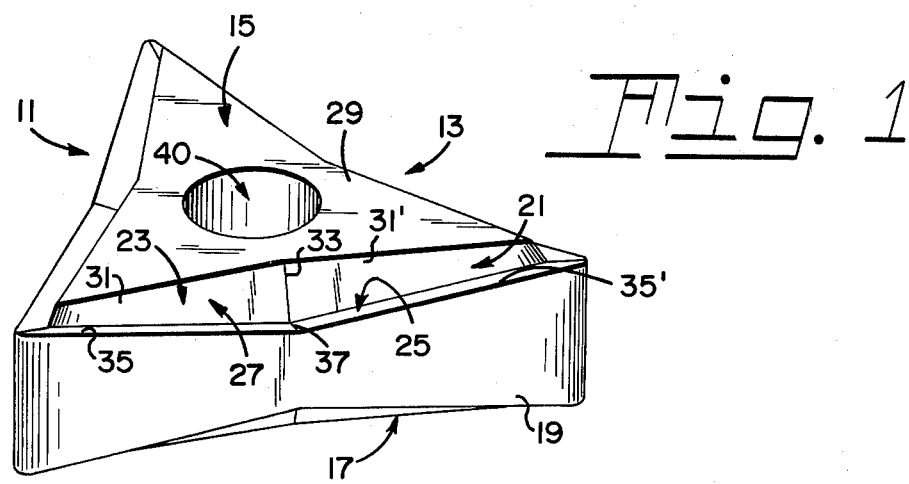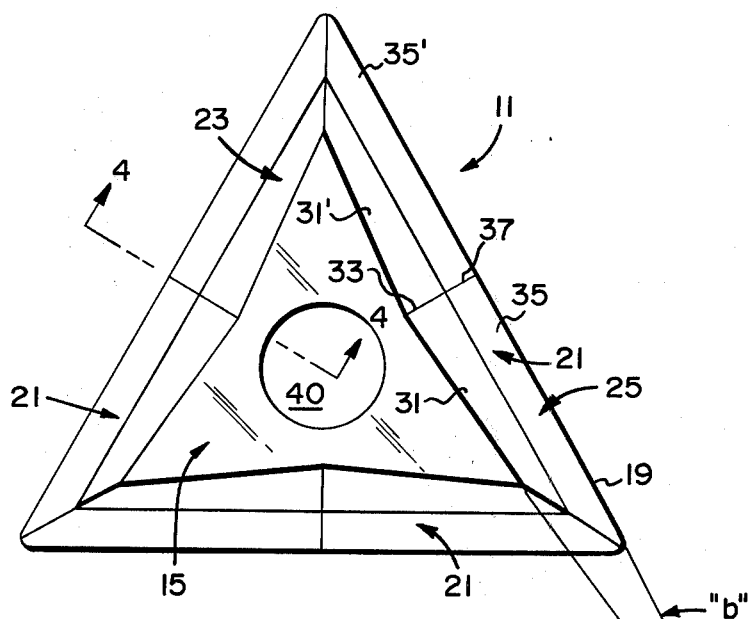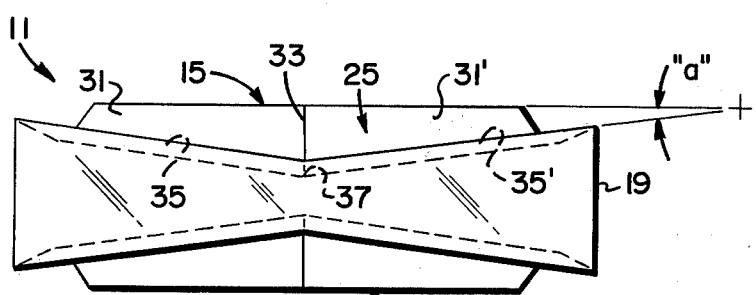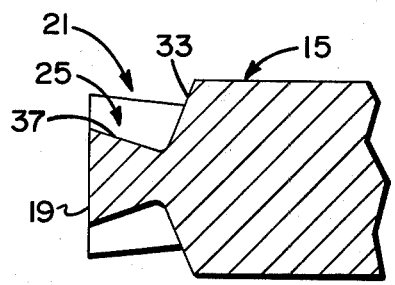

U.S. Patent    Nov. 8, 1977    Sheet 2 of 2    4,056,872
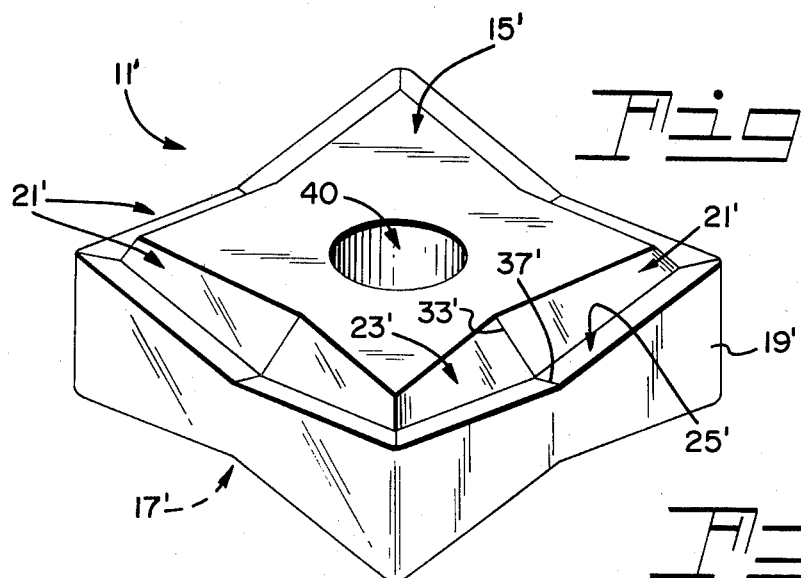
Fig. 5
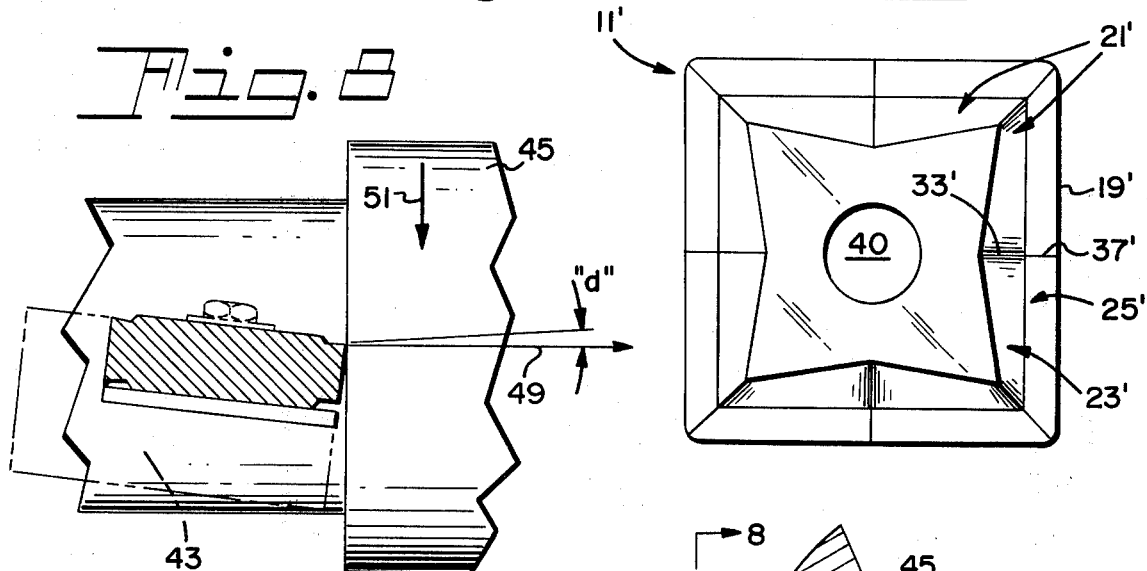
Fig. 8
Fig. 6
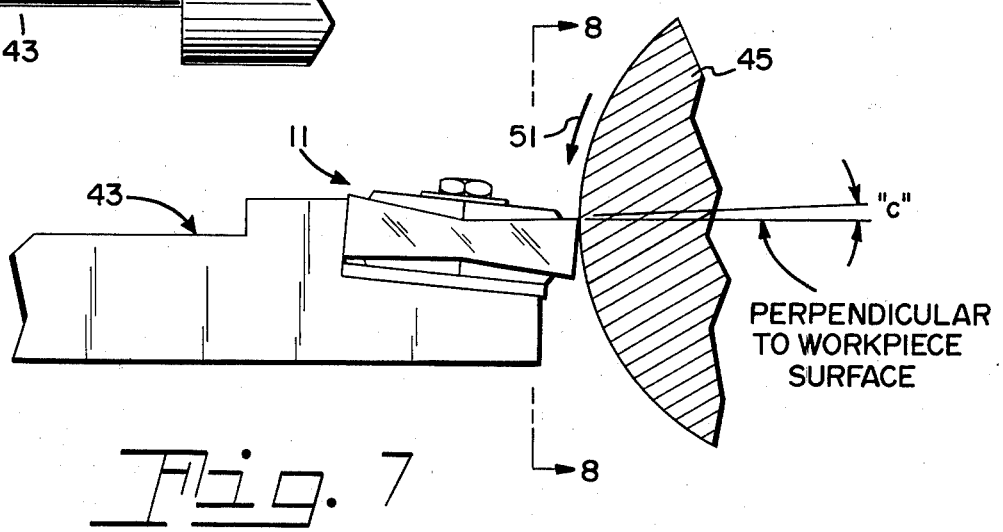
PERPENDICULAR
TO WORKPIECE
SURFACE
Fig. 7

POSITIVE RAKE CUTTING INSERT FOR USE IN NEGATIVE RAKE HOLDERS

CROSS REFERENCE TO RELATED APPLICATION

This application is a continuation of Ser. No. 619,209, filed Oct. 3, 1975, and now abandoned, and assigned to the assignee of the present invention, said Assignment recorded Oct. 3, 1975, Reel 3240, Frame 370.

BACKGROUND OF THE INVENTION

This invention relates to cutting inserts and more particularly to cutting inserts for presenting positive back and side rake angles to a workpiece. Even more particularly, the invention relates to inserts capable of providing the above function while positioned within a negative rake tool holder.

Among the most widely used tool holders in the metal cutting art are those commonly referred to as negative rake tool holders. Such devices present a negative back and side rake angle to the workpiece surface when positioned relative thereto. Accordingly, it has become a common practice to utilize a negative rake angle cutting insert with said negative rake tool holder when performing a desired cutting operation. An example of such a component is fully illustrated in U.S. Pat. No. 3,381,349 wherein an indexable insert is utilized in conjunction with the previously described negative rake tool holder.

With regard to the aforementioned back and side rake angles, is is to be understood that back rake is the angle between the cutting edge of the tool and a perpendicular to the surface of the workpiece being cut. If the back rake angle is on the side of the perpendicular toward which the workpiece surface is moving, the rake angle is defined as being positive. If this angle lies on the opposing side of the perpendicular, the back rake angle is defined as being negative. The aforementioned side rake angle is that angle between the surface of the insert which receives the cut chips from the workpiece and the direction of the insert across the workpiece surface. Similar to the back rake designation, if the angle of the side rake lies on the side of the direction of feed toward which the workpiece surface is moving, the side rake is defined as positive. Accordingly, if it lies on the opposing side of the direction of feed, it is defined as being negative.

It is acknowledged that cutting inserts adaptable for presenting positive back and side rake angles to a workpiece surface when positioned in negative rake holders are known in the art. A typical example of such an insert is illustrated in U.S. Pat. No. 3,399,442. As described therein, it is desirable to form the groove portion of this insert in a concave direction toward one of the insert's faces. As further explained, the described concave formation is achieved by curving the outer region of the insert's recess either spherically or cylindrically to improve chip control. U.S. Pat. No. 3,399,442 further describes a smooth inward extension of the inner recessed portion of the insert to also assist in chip control.

While this and similar cutting devices have improved the metal cutting art, there still exists a need for more positive chip control. It has still been found that chips of relatively extensive helical length are produced when utilizing the devices described above. As can be appreciated, chips of this nature not only impede the cutting process but also present a potential hazard to the tool operator.

It is believed therefore that a cutting insert which provides the operational advantages of being positive in back and side rake angles when positioned within a negative rake tool holder in addition to significantly improving chip control and removal from the surface of a workpiece being cut would constitute an advancement in the art.

OBJECTS AND SUMMARY OF THE INVENTION

It is therefore a primary object of this invention to enhance the metal cutting art.

It is a further object of this invention to provide an improved cutting insert adapted for use in a negative rake holder and for presenting a positive back and side rake angle to the surface of a workpiece when positioned within said holder.

It is a further object of this invention to provide an insert of the nature described above having improved chip control characteristics.

In accordance with a primary aspect of this invention, there is provided an improved cutting insert adapted for being mounted in a negative rake holder and for presenting positive back and side rake angles to the surface of a workpiece being cut. The cutting insert as described includes a body portion having substantially parallel upper and lower surfaces and a peripheral side substantially perpendicular to said upper and lower surfaces. A channel is formed within one of said surfaces and extends from the intersection of said surface and said peripheral side inwardly toward the center of said surface. The channel includes an inner and outer portion, the outer portion being substantially adjacent the peripheral side and the inner portion adjoining said outer portion and including an elevated area extending substantially upward to define an island on said surface. The improvement comprises providing the described inner portion with two substantially straight face portions which intersect at a first common juncture. The improvement further comprises providing the outer portion of the channel with two substantially straight face portions which also intersect at a second common juncture.

BRIEF DESCRIPTION OF THE DRAWINGS

FIG. 1 is an isometric view of one embodiment of the present invention;

FIG. 2 is a top plan view of the embodiment of FIG. 1;

FIG. 3 is a side elevational view of the embodiment of FIG. 1;

FIG. 4 is a side elevational view, partly in section, as taken along the line 4—4 in FIG. 2;

FIG. 5 is an isometric view of another embodiment of the present invention;

FIG. 6 is a top plan view of the embodiment of FIG. 5;

FIG. 7 represents a side elevational view of one embodiment of the invention performing a desired cutting function; and FIG. 8 is an end elevational view as taken along the line 8—8 in FIG. 7.

DETAILED DESCRIPTION OF THE PREFERRED EMBODIMENT

For a better understanding of the present invention, together with other and further objects, advantages, and capabilities thereof, reference is made to the following disclosure and appended claims in connection with the above-described drawings of the invention.

With particular reference to FIG. 1, there is illustrated an improved cutting insert 11 in accordance with a preferred embodiment of the invention. As shown cutting insert 11 includes a body portion 13 having substantially parallel upper and lower surfaces 15 and 17, respectively, and a peripheral side 19 substantially perpendicular to said upper and lower surfaces 15 and 17. As will be described, the insert of FIG. 1 is adapted for forming positive back and side rake angles with the surface of the workpiece to be cut when the insert is mounted in a negative rake holder. Insert 11 is preferably manufactured from a very hard material such as tungsten carbide. This and similar inserts to be described are preferably formed in a pressure molding operation wherein the carbide material is subjected to relatively high temperatures and pressures. Such a process is well known in the art and therefore does not constitute a part of the present invention.

As further illustrated in FIG. 1, insert 11 includes at least one channel 21 formed therein along the entire outer edge of the intersection of one of the surfaces 15 and 17 and peripheral side 19, said channel inwardly extending toward the center of the respective surface. As can be seen in FIG. 1, insert 11 is of a substantially triangular configuration and it is further desired to form a channel within each side of said triangle along both the upper and lower described surfaces. Accordingly, at least six cutting sides are provided with the insert depicted in FIG. 1.

As illustrated, channel 21 includes an inner portion 23 and an outer portion 25. Outer portion 25 is substantially adjacent peripheral side 19 and forms an angle less than 90° with side 19 (illustrated in FIG. 4). Additionally, inner portion 23 adjoins outer portion 25 and includes an elevated area 27 which extends upwardly from outer portion 25 to define an island 29 on surface 15. Still further, outer portion 25 extends downwardly toward the opposing surface, in this case surface 17. It can also be seen that the outer portion of the channel on the lower part of insert 11 extends upwardly toward surface 15. It is only essential to note that the outer portion of the respective channel extends downwardly or away from the surface substantially adjacent said channel. This property is true for all the inserts defined by the present invention.

The improvement as defined by the present invention comprises providing inner portion 23 with two substantially straight face portions 31 and 31' which intersect at a first common juncture 33. The improvement further comprises providing outer portion 25 with two substantially straight face portions 35 and 35' which also intersect at a common juncture, this being second common juncture 37. The described provisiongof the illustrated two straight portions for each of the inner and outer portion of channel 21 have proven substantially advantageous in the control of chip breakage and removal during a metal cutting process. It has been found when using the cutting inserts of FIG. 1 that the formation of helical wound chips is substantially eliminated with the resulting chips being of significantly less length and therefore breaking with much greater frequency. It has also been found that control of the chip movement away from the cutting surface is substantially facilitated by providing the straight sided face portions as described.

In FIG. 2, there is provided a plan view of the insert 11 of FIG. 1. As previously described, insert 11 is a triangular-sided configuration having one channel 21 formed along each side thereof. Outer portions 25 of channel 21 include the described straight face portion 35 and 35' which intersect at second common juncture 37. Furthermore, FIG. 2 more clearly illustrates the straight-sided face portions 31 and 31' of inner portion 23, said face portions intersecting at first common juncture 33. As seen in FIG. 2, straight sides 31 and 31' project inwardly toward the center of upper surface 15. The straight sided configurations for the inner and outer portions of channel 21 thus provide a more facile means of controlling the chip movement away from the workpiece surface than the radial-shaped recesses of the known prior art.

FIG. 3 represents a side view of insert 11, more clearly depicting the downward extension of outer portion 25 toward lower surface 17. Because insert 11 is substantially symmetrical on both sides, it can be seen that the outer portion of a similar channel as formed from lower surface 17 upwardly extends toward upper surface 15. In other terms, this channel extends downwardly from surface 17 when the insert is inverted. Also fully illustrated in FIG. 3 is the upwardly extending first common juncture 33 at which the described straight face portions 31 and 31' intersect. Straight face portions 35 and 35' are also shown as they intersect at a second common juncture 37 (shown hidden).

With further regard to the above figures in the drawings, it has been shown that common junctures 33 and 37 meet in an adjoining relationship and accordingly form an angle therebetween. This is not meant to be limitive however with regard to the present invention but constitutes a preferable embodiment of the invention for providing better chip control. It is to be understood however that the described juncture portions can be somewhat offset with respect to each other and not adjoining as illustrated in FIGS. 1–3. The preferred angle at which the junctures are positioned when in the above described adjoining relationship is within the range of from about 121° to about 127°. It can also be seen in the drawings that each of the described juctures 33 and 37 are substantially centrally located within channel 21 from the ends of each respective side. This is also preferred with the embodiment depicted in FIGS. 5 and 6 of the drawings.

As stated, FIG. 4 more clearly represents the angle formed by the intersection of junctures 33 and 37. As also previously stated, outer portion 25 of channel 21 forms an angle less than 90° with peripheral side 19. This angle further assures the previously described positive back rake angle with the surface of the workpiece being cut.

It is preferred in the present invention that the straight face portions 35 and 35' of outer portion 25 each form an angle of about 6° with the corresponding surface (15) adjacent thereto. This angle is illustrated as "*a*" in FIG. 3.

With reference back to FIG. 2, it can also be seen that straight face portion 31 of inner portion 23 forms an angle with peripheral wall 19 of about 6°, said angle designated as "*b*". It can be further understood that straight face portion 31' similarly forms this angle with peripheral wall 19 but in an opposing manner to that illustrated for face portion 31.

In FIG. 5, there is illustrated insert 11' in accordance with an alternate embodiment of the present invention. Insert 11' is preferably of a rectangular configuration thereby having four sides each intersecting at a common end. As illustrated, rectangular insert 11' includes an upper surface 15' and a peripheral wall 19'. Similar to insert 11 in FIG. 1, insert 11' also includes a lower surface 17' (hidden) which is substantially parallel to upper surface 15'. Located within insert 11' are a corresponding plurality of channels 21' each of which are formed along the entirety of one of the outer edges of upper surface 15' and extend from the intersection of said surface and peripheral side 19' inwardly toward the center of surface 15'. Similar to channels 21 in FIG. 1, channels 21' each include an inner portion 23' and an outer portion 25' each of which meet along a common juncture (33' and 37'). Similar to channels 21, each of the illustrated inner and outer portions is comprised of two substantially straight face portions intersecting at said common junctures. Also similar to insert 11, these face portions are angularly positioned with regard to the corresponding surfaces previously described in FIGS. 2 and 3 (angles "a" and "b"). Accordingly, further description is not believed necessary.

A top plan view of insert 11' is provided in FIG. 6 to more fully illustrate the positioning relationship of the previously described portions of insert 11'. Similar to junctures 33 and 37 of insert 11, junctures 33' and 37' are preferably adjoining in an angular relationship. The preferred angle for these junctures is within the range of from about 125° to about 137°. Still further, each of these junctures are substantially centrically located within channel 21' at the approximate center of the corresponding side of the insert.

All of the inserts described above are illustrated as including an opening 40 therein. This is not meant to be restrictive however with regard to the present invention. It is merely preferred to provide the inserts with said openings to facilitate positioning of this member in a majority of the negative tool holders utilized today. The illustrated opening provides a means whereby a clamp or similar member can be fitted within the opening to secure the insert to the work holder. It is also possible to use a center post and washer-nut combination to hold the insert in place in addition to several other well known securing devices. Accordingly, the previously described means for retaining the inserts are not meant to be limitive with regard to the broad concept of the present invention. That is, it is entirely possible to remove openings 40 from within the inserts entirely and utilize an external clamping member which positively secures the insert to the work holder from above surface 15 or 15'. Such a member is fully illustrated in the previously cited U.S. Pat. No. 3,399,442.

FIG. 7 illustrates the positioning relationship of insert 11 positioned within a negative rake holder 43. With insert 11 removed therefrom, work holder 43 presents a negative back rake angle to workpiece 45 as the workpiece revolves in the direction indicated. As previously mentioned, the negative rake angle is defined by both a back rake and a side rake. Therefore, it is not only necessary to present the downward negative back rake as illustrated in FIG. 7 for the work holder but also to substantially tilt the work holder as illustrated in FIG. 8 to also provide a negative side rake angle. With reference to both FIGS. 7 and 8, it can be seen that the aforementioned side and back rake angles are present when work holder 43 is positioned in the manner indicated. Accordingly, it can also be seen that the inserts as defined by the present invention, when positioned within the negative rake work holder 43, present both a positive back rake angle ("c" in FIG. 7) in addition to a positive side rake angle ("d" in FIG. 8) to workpiece 45. The direction of feed (arrow 49) is illustrated in FIG. 8 in addition to the direction of travel of workpiece 45 (arrow 51 in FIGS. 7 and 8).

As shown in FIGS. 1-3, straight face portions 31 and 31' of inner portion 23 extend along the entire outer edge of surface 15. As further shown, straight face portions 35 and 35' or outer portion 25 extend along the entire length of peripheral side 19. These relationships also hold true for insert 11' shown in FIGS. 5 and 6.

The inserts described above substantially improved the chip control capabilities for metal cutting tools of this nature. It has been determined when utilizing inserts of the nature illustrated and described that elongated helical chip formation is substantially eliminated. It has further been determined that control of the direction of travel of the formed chips is significantly improved over cutting inserts of the known prior art. Accordingly, there has been shown and described what is considered to be a significant improvement in the metal cutting art.

While there has been shown and described what are at present considered the preferred embodiments of the invention, it will be obvious to those skilled in the art that various changes and modifications may be made therein without departing from the scope of the invention as defined by the appended claims.

What is claimed is:

1. In a cutting insert adapted for forming positive back and side rake angles with the surfaces of a workpiece to be cut when said insert is mounted in a negative rake holder, wherein said cutting insert includes a body portion having substantially parallel upper and lower surfaces and peripheral side substantially perpendicular to said upper and lower surfaces, at least one channel extending from the entire outer edge of at least one planar peripheral side portion to the adjacent edge of at least one surface, said channel including an inner and an outer portion, said outer portion forming an angle less than ninety degrees with said peripheral side portion, and extending inwardly therefrom to adjoin said inner portion, said inner portion extending inwardly to adjoin said one surface at an angle greater than 90°, the improvement comprising:

said inner portion and said outer portion each consisting of two substantially straight face portions intersecting at a common juncture substantially centrally located within said channel, said straight face portions of both the inner portion and the outer portion of said channel extending downwardly toward the interior of the body portion of the insert to form an angle within the range of from about 121° to about 127° between said conjunctive straight face portions of said inner and outer portions of said channel, respectively.

2. The improvement according to claim 1 wherein said cutting insert is of a substantially rectangular configuration and said first common juncture and said second common juncture are adjoining and form an angle within the range of from about 125° to about 137°.

3. The improvement according to claim 1 wherein each of said straight face portions of said outer portions of said channel forms an angle with said surface of about 6°.

4. The improvement according to claim 1 wherein each of said straight face portions of said inner portion of said channel forms an angle with said peripheral wall of about 6°.

* * * * *

UNITED STATES PATENT AND TRADEMARK OFFICE
CERTIFICATE OF CORRECTION

PATENT NO. : 4,056,872

DATED : November 8, 1977

INVENTOR(S) : Heinz H. Seidel

It is certified that error appears in the above-identified patent and that said Letters Patent are hereby corrected as shown below:

Col. 4, line 48 - Please delete "juctures" and insert -- junctures --.

Col. 6, line 15 - After "35'" and before "outer" please delete "or" and insert -- of --.

Col. 6, line 67 - Please delete "are adjoining and".

Signed and Sealed this

Sixteenth Day of May 1978

[SEAL]

Attest:

RUTH C. MASON
Attesting Officer

LUTRELLE F. PARKER
Acting Commissioner of Patents and Trademarks